United States Patent [19]

Zhang et al.

[11] Patent Number: 6,028,134
[45] Date of Patent: Feb. 22, 2000

[54] THERMOPLASTIC RESIN COMPOSITION HAVING LASER MARKING ABILITY

[75] Inventors: En Lai Zhang, Chiba; Kiyoshi Sugie, Funabashi; Mioko Suzuki, Chiba; Yoshinari Ogawa, Sagamihara, all of Japan

[73] Assignee: Teijin Limited, Osaka, Japan

[21] Appl. No.: 09/217,070

[22] Filed: Dec. 21, 1998

Related U.S. Application Data

[63] Continuation of application No. 08/699,692, Aug. 15, 1996, abandoned, which is a continuation of application No. 08/501,732, Jul. 12, 1995, abandoned.

[51] Int. Cl.⁷ ............... C08K 3/10; C08K 3/18; C08K 3/22; C08K 3/08
[52] U.S. Cl. ............ 524/406; 524/413; 524/430; 524/431; 524/432; 524/433; 524/435; 524/436; 524/440; 524/441; 523/137; 522/2
[58] Field of Search ............... 524/406, 413, 524/431, 433, 435, 436, 440, 441, 430, 432; 523/137; 522/2

[56] References Cited

U.S. PATENT DOCUMENTS

| | | | |
|---|---|---|---|
| 3,962,163 | 6/1976 | Dickens, Jr. | 524/398 |
| 3,983,086 | 9/1976 | Dickens, Jr. | 524/385 |
| 4,002,597 | 1/1977 | Dickens, Jr. | 524/398 |
| 4,194,072 | 3/1980 | Chang et al. | 525/432 |
| 4,307,047 | 12/1981 | Edinger et al. | 264/478 |
| 4,391,764 | 7/1983 | Edinger et al. | 264/478 |
| 4,401,992 | 8/1983 | Vorst et al. | 346/135.1 |
| 4,424,292 | 1/1984 | Ravinovitch et al. | 524/88 |
| 4,624,710 | 11/1986 | Modly | 106/453 |
| 4,957,961 | 9/1990 | Chandrasekaran | 524/405 |
| 4,959,406 | 9/1990 | Foltin et al. | 524/413 |
| 5,126,496 | 6/1992 | Slaugh | 524/430 |
| 5,128,402 | 7/1992 | Slaugh | 524/430 |
| 5,262,470 | 11/1993 | Shimotsuma et al. | 524/496 |
| 5,364,900 | 11/1994 | Hate et al. | 524/291 |
| 5,422,383 | 6/1995 | Takahashi et al. | 523/136 |

FOREIGN PATENT DOCUMENTS

| | | |
|---|---|---|
| 0105451 | 4/1984 | European Pat. Off. . |
| 0400305 | 12/1990 | European Pat. Off. . |
| 1933338 | 4/1970 | Germany . |
| 4235302 | 4/1994 | Germany . |
| 4329395 | 3/1995 | Germany . |
| 61-177298 | 8/1986 | Japan . |
| 61-92737 | 8/1986 | Japan . |
| 61-41320 | 9/1986 | Japan . |
| 62-59663 | 12/1987 | Japan . |
| 0247314 | 10/1990 | Japan . |
| 4246456 | 9/1992 | Japan . |
| 6-48042 | 2/1994 | Japan . |
| 6-55854 | 3/1994 | Japan . |

OTHER PUBLICATIONS

Database WPI, Week 9424, Derwent Publications Ltd., Abstract of Japanese Laid–Open Patent Publication No. 6–136273 (May 17, 1994).

*Primary Examiner*—Kriellion Sanders
*Attorney, Agent, or Firm*—Sherman and Shalloway

[57] ABSTRACT

A thermoplastic resin composition having laser marking ability, which comprises a thermoplastic resin and at least two kinds of metal oxides, the content of total metal oxides being 0.001 to 10 parts by weight per 100 parts by weight of said thermoplastic resin; and a keyboard having keys composed of the above composition.

7 Claims, No Drawings

THERMOPLASTIC RESIN COMPOSITION HAVING LASER MARKING ABILITY

CROSS-REFERENCE TO RELATED APPLICATIONS

This application is a continuation of application Ser. No. 08/699,692, filed Aug. 15, 1996, abandoned which is a continuation of application Ser. No. 08/501,732, filed Jul. 12, 1995 abandoned.

DETAILED DESCRIPTION OF THE INVENTION

This invention relates to a thermoplastic resin composition having laser marking ability. More specifically, the invention relates to a thermoplastic resin composition which can form distinct marking with excellent contrast upon exposure to laser irradiation.

As a means for marking keytops, printing with ink has heretofore mainly been practiced. In case of printing on surfaces of plastic products, the surfaces are to be cleaned by washing with Flon (chlorofluoro-carbons) for improving adhesion of ink thereto. It is now required, however, to abolish the washing process with Flon to prevent destruction of the ozonosphere, or to develop a marking technology to allow permanent marking. Hence, a means of marking with laser beams is drawing attention, because it enables simplified and effective printing. This technology comprises incorporating a light- or heat-absorbing additive in raw materials in advance, thereby to cause foaming, decomposition or carbonization under the laser irradiation to induce changes in the surface of the material or bleach of pigment or dye, whereby the desired marking is achieved.

Japanese Patent Publication No. 61-11771 discloses a method in which distinct marking with laser beam is formed by incorporating a mount of a carbon black or graphite.

Japanese Laid-open Patent Publication No. 1-254743 discloses a method for improving marking ability of plastics with YAG laser, which comprises adding titanium oxide and optionally further carbon black with the plastics.

Japanese Patent Publication No. 61-41320 and Laid-open Patent Publication No. 61-192737 describe methods of marking, utilizing decoloration or discoloration of pigments, dyestuffs etc.

Japanese Patent Publication No. 2-47314 discloses a marking method in which volatile component(s) in the resin to be marked, such as unpolymerized monomers or decomposition products, are foamed by laser beam to form projection on the resin surface, whereby marking is formed.

Japanese Laid-open Patent Publication No. 4-246456 teaches that marking with good contrast can be obtained by adding to plastics carbon black and/or graphite which are highly thermoconductive.

Furthermore, Japanese Laid-open Patent Publication No. 2-59,663 discloses a process for making plastic key members, using a coloring powder which responds to heat irradiation or a dye powder sensitive to heat radiation.

In those conventional arts, however, the laser marking portion formed by foaming have a low degree of blackness. In particular, use of carbon black markedly enhances the foaming, which causes notable decrease in black color development.

Meanwhile, colored keytops are very much in vogue, and carbon-based pigment material is often used for adjusting colors of keytops. Because carbon causes foaming under laser marking, the coloring at the laser marking portion is liable to be liver brown, not black. This inevitably renders application of carbon-based pigment materials to key tops difficult, and hence, it has been desired to make fine marking having more high contrast and black coloring.

It is, therefore, an object of the present invention to provide a novel thermoplastic resin composition having laser marking ability.

Another object of the present invention is to provide a thermoplastic resin composition which is capable of forming distinct marking of excellent contrast upon exposure to laser irradiation.

Still another object of the present invention is to provide a thermoplastic resin composition which gives marking with clear black color development under laser irradiation.

Other objects and advantages of the present invention will become apparent upon reading the following description.

According to the present invention, above objects and advantages of the invention are accomplished by a thermoplastic resin composition having laser marking ability, which comprises a thermoplastic resin and at least two kinds of metal oxides, the content of total metal oxides being 0.001 to 10 parts by weight per 100 parts by weight of said thermoplastic resin.

Examples of thermoplastic resins used for the present invention include such general-purpose resins as polyethylene, polypropylene, ABS and the like; and such engineering plastics as aromatic saturated polyesters, polycarbonates, polyamides, polyacetals and the like.

Among these, the preferred aromatic saturated polyesters are those whose main acid component is derived from terephthalic acid, 2,6-naphthalenedicarboxylic acid, or their ester-forming derivatives and main diol component is composed of at least one aliphatic diol such as ethylene glycol, trimethylene glycol, tetramethylene glycol, hexamethylene glycol, neopentyl glycol and the like. Of the polyesters, aromatic polyesters of high crystallization rate, e.g., polybutylene terephthalate, polypropylene terephthalate, polyethylene terephthalate, polybutylene-2,6-naphthalenedicarboxylate are particularly preferred, the most preferred being polybutylene terephthalate.

Such thermoplastic aromatic polyesters may be partially substituted with a copolymerizable component. Examples of the copolymerizable components include aromatic dicarboxylic acids, e.g., alkyl-substituted phthalic acids such as isophthalic acid, phthalic acid, methylterephthalic acid and methylisophthalic acid, naphthalenedicarboxylic acids such as 2,6-naphthalenedicarboxylic acid, 2,7-naphthalenedicarboxylic acid and 1,5-naphthalenedicarboxylic acid, diphenyldicarboxylic acids such as 4,4'-diphenyldicarboxylic acid and 3,4'-diphenyldicarboxylic acid, and diphenoxyethanedicarboxylic acids such as 4,4'-diphenoxyethanedicarboxylic acid, etc.; aliphatic or alicyclic dicarboxylic acids such as succinic acid, adipic acid, sebacic acid, azelaic acid, decanedicarboxylic acid, cyclohexanedicarboxylic acid, etc.; alicyclic diols such as 1,4-cyclohexanedimethanol; dihydroxybenzenes such as hydroquinone, resorcin, etc.; bisphenols such as 2,2-bis(4-hydroxyphenyl)-propane, bis(4-hydroxyphenyl)-sulfone, etc.; aromatic diols such as ether diol obtained from bisphenols and glycols such as ethylene glycol; and hydroxycarboxylic acids such as ε-hydroxycaproic acid, hydroxybenzoic acid, hydroxyethoxybenzoic acid, etc.

The above aromatic polyesters may further be copolymerized with not more than 1.0 mol %, preferably not more than 0.5 mol %, more preferably not more than 0.3 mol %, of a polyfunctional ester-forming acid such as trimesic acid, trimellitic acid or the like or a polyfunctional ester-forming alcohol such as glycerine, trimethylol propane, pentaerythritol, etc., as a branching component.

Preferred polycarbonate resins to be used in this invention are those which are derived from dihydric phenols and have molecular weight ranging 10,000 to 100,000, more preferably 15,000 to 60,000, as expressed in terms of viscosity-average molecular weight. Such polycarbonate resins are usually obtained through reaction of dihydric phenols with carbonate precursors according to the solution phase or melt phase method. Examples of the dihydric phenols include 2,2-bis(4-hydroxyphenyl)propane (bisphenol-A), 1,1-bis(4-hydroxyphenyl)ethane, 2,2-bis(4-hydroxy-3-methylphenyl) propane and bis(4-hydroxyphenyl) sulfone, etc. Of those, bis(4-hydroxyphenyl) alkanes are preferred, the most preferred being bisphenol-A.

The ABS resin used for the invention is selected from known resins formed by adding acrylonitrile and butadiene, in various forms, to polystyrene. For example, 1) a mixture of styrene-acrylonitrile copolymer resin (AS resin) with polybutadiene (BR); 2) BR grafted with styrene and acrylonitrile; 3) a molten mixture of AS resin with the product of 2) above, and 4) a molten mixture of butadiene-acrylonitrile copolymer with AS resin may be exemplified.

As the thermoplastic resins to be used in the present invention, polyethylene terephthalate, polybutylene terephthalate, polybutylene naphthalenedicarboxylate, polycarbonate, polyamide, polyacetal, ABS, polyethylene and polypropylene are particularly preferred. These may be used either singly or as mixtures.

The resin composition of the present invention contains at least two kinds of metal oxides.

Said at least two kinds of metal oxides are selected from a group consisting of (a) oxides of monovalent or divalent metals, (b) oxides of trivalent metals and (c) oxides of tetra- to hexa-valent metals.

Examples of the oxides of monovalent or divalent metals are $K_2O$, $Na_2O$, $Li_2O$, $Cu_2O$, CaO, MgO, CoO, PbO, ZnO, BaO, FeO, MnO, CdO, CuO, NiO and SrO.

The oxides of trivalent metals include, for example, $Al_2O_3$, $B_2O_3$, $Fe_2O_3$, $Sb_2O_3$, $Cr_2O_3$, $Mn_2O_3$ and $As_2O_3$.

The oxides of tetra- to hexa-valent metals include, for examples, $SiO_2$, $TiO_2$, $SnO_2$, $ZrO_2$, $CeO_2$, $Sb_2O_5$, $V_2O_5$, $P_2O_5$, $UO_3$ and $MoO_3$.

Such at least two kinds of metal oxides are used in a combined amount of 0.001 to 10 parts by weight per 100 parts by weight of the thermoplastic resin.

When the amount is less than 0.001 part by weight, a clear color development is difficult to attain, whereas when it exceeds 10 parts by weight, a clear contrast between the unmarked surface of shaped articles and the coloring portion is difficult to attain because that homogeneous marking is damaged. Both cases are therefore undesirable.

The total content of said at least two metal oxides preferably ranges 0.001 to 5 parts by weight, more preferably 0.01 to 2 parts by weight, per 100 parts by weight of the thermoplastic resin.

The at least two kinds of metal oxides may each form a compound independently of each other, or may together form a complex.

It is preferable that said at least two kinds of metal oxides form a composition represented by the formula below;

$$R_{1-2}O \cdot xR'_2O_3 \cdot yR''O_{2-3}$$

wherein $R_{1-2}O$ stands for an oxide of a monovalent or divalent metal; $R'_2O_3$ stands for an oxide of a trivalent metal; $R''O_{2-3}$ stands for an oxide of a tetra- to hexa-valent metal; x is a number ranging 0.1 to 1.2; and y is a number ranging 1 to 12.

Upon being calcined, the at least two kinds of metal oxides form a state of "glaze", which has no fixed chemical structure, like glass. While such "glaze" can be classified in various manner, e.g., china glaze and porcelain glaze, etc. according to the kinds of the calcination product; feldspars glaze, lime glaze, etc. according to the starting material which is the source of main component; or frit glaze, salt glaze, etc. according to the type of production system. It is of little significance to which of these classes does the "glaze" state as referred to in this invention belongs.

In the process of converting at least two kinds of metal oxides to glaze state under heating, various phenomena such as dehydration, chemical reaction(s) between or among solid phases at temperatures below melting point or decomposition point, decomposition of carbonates or sulfates, partial fusion of starting materials, formation of an eutectic mixture, inter-fusion of molten salts, volatilization of a part of the starting components, etc. are involved in complex manner.

Hence, when such plural metal oxides are converted to a state of glaze and vitrified, their color developing ability can be improved. Furthermore, the glaze itself may promote pyrolysis of the resin and develop colors.

The thermoplastic resin composition of the present invention may further contain a black pigment or black dye, in an amount of not more than 2 parts by weight per 100 parts by weight of the thermoplastic resin.

As the black pigments or black dyes, for example, carbon-based black pigments, black metal oxides and black dyes are conveniently used. Of these, black metal oxides are more preferred. As the black metal oxides, low valency titanium oxides which are expressed by the formula, $Ti_nO_{2n-1}$ (n=1 to 5) are preferred. As such low order titanium oxides, for example, TiO, $Ti_2O_3$, $Ti_3O_5$, $Ti_4O_7$ and $Ti_5O_9$ are preferred, $TiO_n$ (n=1 to 1.99) being particularly preferred.

According to the present invention, furthermore, other pigments and dyes may be added, depending on the intended use of individual compositions.

As such other pigments, for example, inorganic pigments, e.g., basic lead carbonate, basic lead sulfate, basic lead silicate, metal sulfide such as lithopone or zinc sulfide; and organic pigments such as azo-, azomethine-, methine-, indanthrone-, anthraquinone-, pyranthrone-, flavanthrone-, benzanthrone-, phthalocyanine-, perinone-, perylene-, dioxadine-, thioindigo-, isoindoline-, isoindolinone-, quinacridone- and quinophthalone-type pigments may be used.

Examples of the organic dyes include anthraquinone disperse dyes, metal complexes of azo dyes and fluorescent dyes.

The thermoplastic resin composition of the present invention may further contain, within the range not impairing the objects of the invention, ordinary additives such as a glass-reinforcing agent, a granular or platy filler, a flame-retardant, a releasing agent, a lubricant, a slip additive, a nucleating agent, a colorant, an antioxidant, a heat stabilizer, a weatherability (light) stabilizer and a modifying agent such as impact resistance-improving agent, etc.

The thermoplastic resin composition of the present invention can be obtained by blending a thermoplastic resin with metal oxides of the prescribed amount by an arbitrary blending method. It is preferred to disperse the components to be blended more uniformly. More specifically, the whole or a part may be simultaneously or separately blended in a mixing machine such as, for example, a blender, a kneader, a Bumbury mixer, a roll, an extruder, etc. to be homogenized. Furthermore, it is also possible to granulate the composition by melt-kneading a composition formed by advance dry-blending, in a heated extruder to homogenize the composition, extruding the melt into a wire form, and thereafter cutting the product to any desired length.

Molding processing of the thermoplastic resin composition of the present invention can be quite easily practiced by ordinary means using common molding machines of thermoplastic resin in general.

Hereinafter the present invention is explained with reference to working Examples, it being understood that the invention is in no sense limited by the following Examples.

In the Examples, marking was carried out with YAG laser (Laser Marker SL 475 $E_2$, manufactured by NEC Corporation).

Marking was evaluated according to the degree of color difference (contrast) between a molded article surface and a marking portion at which a color was developed upon exposure to the laser beam, and to the foaming condition. For determining the color difference, a Color Analyzer TC-1800 MK-11 manufactured by Tokyo Denshoku Co., Ltd was used, and the result was expressed by the difference in brightness, $\Delta L^*$. As for the foaming condition, it was confirmed whether a uniform and fine foam was formed.

EXAMPLE 1–10, COMPARATIVE EXAMPLE 1–16

A glaze (metal oxides) as later identified, of the amount as indicated in Table 1, was added to a thermoplastic resin, together melt-kneaded in an extruder and pelletized. The products injection-molded into a disc form were marked and evaluated for the marking. In Comparative Example 1, carbon was added. Titanium oxide was added in Comparative Example 2, and in Comparative Examples 3 to 6, each of the thermoplastic resins alone were marked. The results are as shown in Table 1 below.

TABLE 1

| Composition (wt %) | | Brightness (L*) | | Color | |
|---|---|---|---|---|---|
| Thermoplastic resin | glaze | molded article surface | Coloring portion | difference (L*) | Foaming Condition |
| Ex. 1 | a-1)98.0 | b-2)2.0 | 66 | 33 | 33 | good |
| Ex. 2 | a-1)99.0 | b-2)1.0 | 73 | 35 | 38 | good |
| Ex. 3 | a-1)99.5 | b-2)0.5 | 77 | 31 | 46 | good |
| Ex. 4 | a-1)99.9 | b-2)0.1 | 77 | 32 | 45 | good |
| Ex. 5 | a-1)99.95 | b-2)0.05 | 78 | 32 | 46 | good |
| Ex. 6 | a-1)99.99 | b-1)0.01 | 82 | 35 | 47 | good |
| Ex. 7 | a-1)99.995 | b-1)0.005 | 81 | 35 | 46 | good |
| Ex. 8 | a-2)99.99 | b-1)0.01 | 43 | 29 | 14 | good |
| Ex. 9 | a-3)99.99 | b-1)0.01 | 58 | 30 | 28 | good |
| Ex. 10 | a-4)99.99 | b-1)0.01 | — | 20 | — | good |
| Comp. Ex. 1 | a-1)99.995 | Carbon 0.005 | 54 | 41 | 14 | no good |
| Comp. Ex. 2 | a-1)98.0 | Titanium oxide 2.0 | 89 | 50 | 39 | good |
| Comp. Ex. 3 | a-1)100 | — | 79 | 49 | 30 | no good |
| Comp. Ex. 4 | a-2)100 | — | 43 | 31 | 12 | no good |

TABLE 1-continued

| Composition (wt %) | | Brightness (L*) | | Color | |
|---|---|---|---|---|---|
| Thermoplastic resin | glaze | molded article surface | Coloring portion | difference (L*) | Foaming Condition |
| Comp. Ex. 5 | a-3)100 | — | 59 | 34 | 25 | no good |
| Comp. Ex. 6 | a-4)100 | — | — | 63 | — | no good |

The codes in Table 1 denote the following starting materials, respectively.
(a) Component
a-1) polybutylene terephthalate (PBT) 7000N, product of Teijin Limited.
a-2) polyolefin HA300, product of Tonen K.K.
a-3) ABS SANTAC ST30, product of Mitsui Toatsu Chemicals, Inc.
a-4) polycarbonate (PC) L1250, product of Teijin Chemicals, Ltd.
(b) Component
b-1) Turkish Blue glaze (main components: Fukushima feldspar, silica, copper oxide, barium carbonate, Asa Kaobin, lithium carbonate), product of Towa K.K.
b-2) Glaze (main components: $SiO_2$, $Al_2O_3$, $B_2O_3$, PbO, F) product of Ferro Enamels (Japan) Limited
In Comparative Examples:
Comparative Example 1) Carbon manufactured by Mitsubishi Kasei Corporation
Comparative Example 2)
Titanium oxide manufactured by Ishihara Sangyo K.K.

In Comparative Example 3 the foaming condition was poor and the coloring portions had high brightness and hence the marking of the product was evaluated "no good". In contrast thereto, in Examples 1–7 both the foaming condition and brightness of coloring portions were improved, and the products exhibited good marking.

On the other hand, a favorable foaming condition was achieved in Comparative Example 2, but the coloring portion had high brightness and color tone differing from those in the working Examples of the present invention.

In Comparative Example 1, a good contrast was not obtained because the molded product surface was colored and the marked portion developed a color of high brightness.

In comparison with Comparative Example 4, foaming condition was improved in Example 8.

In comparison with Comparative Example 5, foaming condition was improved in Example 9.

While the product of Comparative Example 6 was scarcely marked, that of Example 10 exhibited good marking, the brightness in the coloring portion being very low.

EXAMPLE 11–18

The various starting materials as identified in Table 2 were homogeneously dry-blended in advance at the prescribed quantitative ratios, and the mixtures were each melt-kneaded in a vented twin screw extruder with the screw diameter 44 mm, under conditions of a cylinder temperature of 180° C. to 260° C., screw rotation speed of 160 rpm and a discharge rate of 40 kg/hr. The molten mixture was discharged as threads through the die, cooled and cut to provide pellets for molding.

Using these pellets, personal computer key tops for laser marking were formed with an injection molding machine with an injection capacity of 5 ounces under such conditions as an injection pressure of 800 kg/cm$^2$, cooling time 15 seconds and the whole molding cycle of 28 seconds.

The results of these experiments are shown in Table 2.

TABLE 2

| | Component a | | Component b | Other component | | | | Black coloring |
|---|---|---|---|---|---|---|---|---|
| | a-1 | a-3 | b-1 | T-1 | T-2 | T-3 | T-4 | |
| Ex. 11 | 99.99 | — | 0.01 | — | — | — | — | ⊚ |
| Ex. 12 | — | 99.99 | 0.01 | — | — | — | — | ⊚ |
| Ex. 13 | 99.50 | — | 0.05 | — | — | — | — | ⊚ |
| Ex. 14 | — | 99.50 | 0.05 | — | — | — | — | ⊚ |
| Ex. 15 | 98.97 | — | 0.50 | — | 0.03 | 0.50 | — | ⊚ |
| Ex. 16 | 99.36 | — | 0.10 | — | 0.01 | — | 0.50 | ⊚ |
| Ex. 17 | — | — | 0.50 | — | 0.03 | 0.50 | 0.50 | ⊚ |
| Ex. 18 | — | — | 0.10 | — | 0.01 | — | — | ⊚ |
| Comp. Ex. 7 | 100.00 | — | — | — | — | — | — | X |
| Comp. Ex. 8 | — | 100.00 | — | — | — | — | — | X |
| Comp. Ex. 9 | 99.90 | — | — | 0.10 | — | — | — | X |

In Table 2, significations of the codes, a-1, a-3 and b-1 are same as those in Table 1. The other components T-1, T-2, T-3 and T-4 are identified below:
T-1) carbon, Ketjen Black EC 600 JD, manufacture by Lion Corporation
T-2) black titanium oxide, M-1, manufactured by Ishihara Sangyo K.K.
T-3) a gray pigment, manufactured by Dainichi Seika Kogyo K.K.
T-4) an ivory-color pigment, manufactured by Dainichi Seika Kogyo K.K.
The evaluation marks in Table 2 have the following significations:
⊚: excellent black color-developing property
X: poor black color-developing property.

What is claimed is:

1. A keyboard having keys composed of a thermoplastic resin composition, said thermoplastic resin composition comprising (i) a thermoplastic resin and
   (ii) a glaze having an oxide composition represented by the following formula:

$R_{1-2}O \cdot xR'_2O_3 \cdot yR''O_{2-3}$ wherein
   $R_{1-2}O$ stands for an oxide of a monovalent or divalent metal,
   $R'_2O_3$ stands for an oxide of a trivalent metal,
   $R''O_{2-3}$ stands for an oxide of a tetra- to hexa-valent metal,
   x is a number ranging from 0.1 to 1.2, and
   y is a number ranging 1 to 12,
   said glaze being uniformly dispersed in said thermoplastic resin,
   the content of the glaze being 0.001 to 2 parts by weight per 100 parts by weight of said thermoplastic resin,
   said thermoplastic resin composition being markable upon exposure to laser radiation,
   said keys having on their tops laser-marked numerals or codes.

2. A method of making keys of a keyboard comprising exposing keys made from a thermoplastic composition to laser irradiation to form distinct laser markings on said keys, said thermoplastic resin composition comprising (i) a thermoplastic resin which is at least one member selected from the group consisting of polyethylene terephthalate, polybutylene terephthalate, polybutylene naphthalenedicarboxylate, polycarbonate, polyamide, polyacetal, ABS, polyethylene and polypropylene and
   (ii) a glaze of metal oxides, said glaze having a composition represented by the following formula:

$R_{1-2}O \cdot xR'_2O_3 \cdot yR''O_{2-3}$ wherein
   $R_{1-2}O$ stands for an oxide of a monovalent or divalent metal,
   $R'_2O_3$ stands for an oxide of a trivalent metal,
   $R''O_{2-3}$ stands for an oxide of a tetra- to hexa-valent metal,
   x is a number ranging from 0.1 to 1.2, and
   y is a number ranging 1 to 12,
   said glaze being uniformly dispersed in said thermoplastic resin,
   the content of the glaze being 0.001 to 2 parts by weight per 100 parts by weight of said thermoplastic resin,
   said thermoplastic resin composition being markable upon exposure to laser radiation.

3. A keyboard having keys composed of a thermoplastic resin composition, said thermoplastic resin composition comprising (i) a thermoplastic resin which is at least one member selected from the group consisting of polyethylene terephthalate, polybutylene terephthalate, polybutylene naphthalenedicarboxylate, polycarbonate, polyamide, polyacetal, ABS, polyethylene and polypropylene and
   (ii) a glaze of metal oxides, said glaze having a composition represented by the following formula:

$R_{1-2}O \cdot xR'_2O_3 \cdot yR''O_{2-3}$ wherein
   $R_{1-2}O$ stands for an oxide of a monovalent or divalent metal,
   $R'_2O_3$ stands for an oxide of a trivalent metal,
   $R''O_{2-3}$ stands for an oxide of a tetra- to hexa-valent metal,
   x is a number ranging from 0.1 to 1.2, and
   y is a number ranging 1 to 12,
   said oxide of a monovalent or divalent metal being selected from the group consisting of $K_2O$, $Na_2O$, $Li_2O$, $Cu_2O$, CaO, MgO, CoO, PbO, ZnO, BaO, FeO, MnO, CdO, CuO, NiO, and SrO, said oxide of a trivalent metal being selected from the group consisting of $Al_2O_3$, $B_2O_3$, $Fe_2O_3$, $Sb_2O_3$, $Cr_2O_3$, Mn$_2$O$_3$ and As$_2$O$_3$, said oxide of a tetra- to hexa-valent metal being selected from the group consisting of SiO$_2$, TiO$_2$, SnO$_2$, ZrO$_2$, CeO$_2$, Sb$_2$O$_5$, V$_2$O$_5$, UO$_3$ and MoO$_3$, said glaze being uniformly dispersed in said thermoplastic resin, the content of the glaze being 0.001 to 2 parts by weight per 100 parts by weight of said thermoplastic resin, said thermoplastic resin composition being markable upon exposure to laser radiation, said keys having on their tops laser-marked numerals or codes.

4. A method of making keys of a keyboard comprising exposing keys made from a thermoplastic resin composition to laser irradiation to form distinct laser markings on said keys, said thermoplastic resin composition comprising (i) a thermoplastic resin which is at least one member selected from the group consisting of polyethylene terephthalate, polybutylene terephthalate, polybutylene naphthalenedicarboxylate, polycarbonate, polyamide, polyacetal, ABS, polyethylene and polypropylene and (ii) a glaze of metal oxides, said glaze having a composition represented by the following formula:

$$R_{1-2}O \cdot xR'_2O_3 \cdot yR''O_{2-3}$$

wherein $R_{1-2}O$ stands for an oxide of a monovalent or divalent metal, $R'_2O_3$ stands for an oxide of a trivalent metal, $R''O_{2-3}$ stands for an oxide of a tetra- to hexa-valent metal, x is a number ranging from 0.1 to 1.2, and y is a number ranging 1 to 12, said oxide of a monovalent or divalent metal being selected from the group consisting of K$_2$O, Na$_2$O, Li$_2$O, Cu$_2$O, CaO, MgO, CoO, PbO, ZnO, BaO, FeO, MnO, CdO, CuO, NiO, and SrO, said oxide of a trivalent metal being selected from the group consisting of Al$_2$O$_3$, B$_2$O$_3$, Fe$_2$O$_3$, Sb$_2$O$_3$, Cr$_2$O$_3$, Mn$_2$O$_3$ and As$_2$O$_3$, said oxide of a tetra- to hexa-valent metal being selected from the group consisting of SiO$_2$, TiO$_2$, SnO$_2$, ZrO$_2$, CeO$_2$, Sb$_2$O$_5$, V$_2$O$_5$, UO$_3$ and MoO$_3$, said glaze being uniformly dispersed in said thermoplastic resin, the content of the glaze being 0.001 to 2 parts by weight per 100 parts by weight of said thermoplastic resin, said thermoplastic resin composition being markable upon exposure to laser radiation.

5. A keyboard having keys with distinct markings said keys being composed of a thermoplastic resin composition and said distinct markings being formed on said keys by exposing said keys to laser irradiation, wherein said thermoplastic resin composition comprises (i) a thermoplastic resin which is at least one member selected from the group consisting of polyethylene terephthalate, polybutylene terephthalate, polybutylene naphthalenedicarboxylate, polycarbonate, polyamide, polyacetal, ABS, polyethylene and polypropylene and (ii) a glaze of metal oxides, said glaze having a composition represented by the following formula:

$$R_{1-2}O \cdot xR'_2O_3 \cdot yR''O_{2-3}$$

wherein $R_{1-2}O$ stands for an oxide of a monovalent or divalent metal, $R'_2O_3$ stands for an oxide of a trivalent metal, $R''O_{2-3}$ stands for an oxide of a tetra- to hexa-valent metal, x is a number ranging from 0.1 to 1.2, and y is a number ranging 1 to 12, wherein the oxide of a monovalent or divalent metal is selected from the group consisting of K$_2$O, Na$_2$O, Li$_2$O, Cu$_2$O, CaO, MgO, CoO, PbO, ZnO, BaO, FeO, MnO, CdO, CuO, NiO, and SrO, said oxide of a trivalent metal being selected from the group consisting of Al$_2$O$_3$, B$_2$O$_3$, Fe$_2$O$_3$, Sb$_2$O$_3$, Cr$_2$O$_3$, Mn$_2$O$_3$ and As$_2$O$_3$, said oxide of a tetra- to hexa-valent metal being selected from the group consisting of SiO$_2$, TiO$_2$, SnO$_2$, ZrO$_2$, CeO$_2$, Sb$_2$O$_5$, V$_2$O$_5$, UO$_3$ and MoO$_3$, said glaze being uniformly dispersed in said thermoplastic resin, wherein the glaze content is 0.005 to 2 parts by weight per 100 parts by weight of said thermoplastic resin, said thermoplastic resin composition being markable upon exposure to laser radiation.

6. A method of making keys of a keyboard comprising exposing keys made from a thermoplastic resin composition to laser irradiation to form distinct laser markings on said keys, said thermoplastic resin composition comprising (i) a thermoplastic resin and (ii) a glaze of metal oxides, said glaze having a composition represented by the following formula:

$$R_{1-2}O \cdot xR'_2O_3 \cdot yR''O_{2-3}$$

wherein $R_{1-2}O$ stands for an oxide of a monovalent or divalent metal, $R'_2O_3$ stands for an oxide of a trivalent metal, $R''O_{2-3}$ stands for an oxide of a tetra- to hexa-valent metal, x is a number ranging from 0.1 to 1.2, and y is a number ranging 1 to 12, said glaze being uniformly dispersed in said thermoplastic resin, the content of the glaze being 0.001 to 2 parts by weight per 100 parts by weight of said thermoplastic resin, said thermoplastic resin composition being markable upon exposure to laser radiation.

7. The keyboard of claim 1, wherein the thermoplastic resin composition further comprises a black pigment or a black dye in an amount of not more than 2 parts by weight per 100 parts by weight of the thermoplastic resin, said black pigment having the following formula:

$$Ti_nO_{2n-1}$$

wherein n is an integer of 1 to 5.

* * * * *